UNITED STATES PATENT OFFICE.

JAMES TODD, OF ALLEGHENY, PENNSYLVANIA.

MANUFACTURE OF VARNISH-GUM.

SPECIFICATION forming part of Letters Patent No. 587,345, dated August 3, 1897.

Application filed April 20, 1896. Serial No. 588,371. (No specimens.)

*To all whom it may concern:*

Be it known that I, JAMES TODD, a resident of Allegheny, in the county of Allegheny and State of Pennsylvania, have invented a new and useful Improvement in the Manufacture of Varnish-Gums; and I do hereby declare the following to be a full, clear, and exact description thereof.

My invention relates to varnish-gums and their manufacture, its object being to form a varnish-gum from a cheap resinous compound which shall have a high melting-point and therefore form a permanent and hard varnish. It is found that the ordinary rosin of commerce known as "colophony" or "abietic acid" has a low melting-point, being about 65° centigrade, and that when the varnish is formed from this gum on account of the low melting-point it is liable to become sticky at ordinary temperatures and will melt and crack under the heat of the sun. For these reasons it has been considered necessary in forming a high-grade varnish to employ gums or resins having a much higher melting-point than the ordinary rosin or colophony, which gums are exceedingly expensive and therefore largely increase the cost of the high-grade varnish. By my invention the cheaper gums, such as rosin or abietic acid, can be changed in their chemical nature so as to raise their melting-point very materially and thereby make such gums practicable for the manufacture of high-grade varnishes and like purposes for which the ordinary rosin could not be satisfactorily employed.

My invention consists, generally stated, in combining an acid gum having a comparatively low melting-point with a metallic oxid, thus forming a metallic soap, and then raising the temperature thereof until a chemical change in the metallic soap takes place and a gum compound is precipitated having a comparatively high melting-point, this chemical reaction being also evidenced by the evolution of carbon dioxid and watery vapor. It also consists in the resultant product—to wit, a chemical precipitate having the properties hereinafter referred to.

As it is expected to employ the invention more particularly for the treatment of the ordinary rosin of commerce known as "colophony" or "abietic acid," because of the cheapness of such gum, I will describe the invention in connection with the same, it being understood, however, that it is believed to be applicable to the treatment of all gums which are of an acid nature. The preferred way of manufacturing the gum compound is to introduce the ordinary rosin with a suitable solvent and with the metallic oxid in about the proper proportion to unite chemically therewith, this differing, of course, according to the oxid employed. For example, I take the ordinary rosin with zinc oxid, employing about eighty-nine and one-half ($89\frac{1}{2}$) parts of rosin and ten and one-half ($10\frac{1}{2}$) parts of zinc oxid, by weight, and introduce the same into a still or tank with a suitable proportion of benzin to act as a solvent—for example, employing about an equal quantity, by weight, of benzin to the rosin present. This mixture is heated gradually and preferably maintained at a low heat, so that there is practically no distillation of the benzin; but the rosin is dissolved in the solvent, and the mass then kept in such ebullition as to bring the rosin into contact with the oxid, so forming a neutral metallic oxid soap by the chemical combination of the acid gum with the basic oxid. The soap so obtained is then in condition for the making of the gum product, and I then raise the temperature, distilling off a portion of the solvent, as benzin, which is present, and when the proper heat is reached a decomposition of the chemical structure of the gum takes place, evolving carbon dioxid and watery vapor, and the material is changed into a different chemical compound which is precipitated and gathers in the bottom of the tank as a practically solid crystalline mass. The temperature varies according to the solvent used, and the precipitation generally takes place at from ten (10) to fifty (50) degrees centigrade above the boiling-point of the solvent used. The gum compound so precipitated is the resultant product desired to be obtained, and it is found to have a much higher melting-point than the ordinary gum, its melting-point being raised to over two hundred degrees (200°) centigrade, which is much higher than any temperature to which the varnish is subjected under ordinary uses, and therefore provides for the manufacture of a varnish of high grade from the cheap rosin or like gum.

In the manufacture of the gum compound the rosin and metallic oxid, such as zinc oxid, can be made without the employment of solvents, being properly intermingled and heated so as to melt the gum, when it is found that by maintaining the necessary heat the chemical union of the gum with the metallic oxid will take place and the new gum compound be precipitated. It is considered more desirable, however, to employ a solvent for the rosin, as above described, and any suitable solvent—such as the benzin above referred to, turpentine, linseed-oil, benzol, or other suitable material—may be employed for this purpose. The resultant gum compound obtained in this way is found to have the following qualities: It has a melting-point over two hundred degrees (200°) centigrade. As heretofore obtained, it is a white, opaque, crystalline mass, though with some gums it may be obtained in an amorphous state. It is a practically-neutral compound insoluble in benzin, as shown by practical tests, and soluble in benzol, turpentine, and linseed-oil.

When the gum compound is dissolved in a suitable solvent, such as in the manufacture of varnish, it unites therewith and is deposited therefrom in an amorphous state, as is the case with the ordinary varnish-gums.

I find the most satisfactory way of operating to be to first form the gum compound as above described, and while it remains in the tank or still to introduce the necessary materials to form the varnish or varnish-base. For example, when the gum compound is precipitated, as above described, it forms in a solid mass, and where any mechanical stirring apparatus is employed it checks the movement of the same. By the introduction of suitable liquids, such as turpentine or linseed-oil, or both, and the gradual heating of the mass the gum compound is taken up by said liquids and gradually dissolved therein, so forming the varnish or varnish-base, and at the same time any suitable drier may be added thereto.

In the use of the varnish formed from the gum compound it is found that it forms a glossy surfacing, giving protection to the surface against water or any heat to which the ordinary wood surfaces are liable to be exposed, and that it is lasting and forms a practically perfect protection thereto. The varnish formed in this way can be produced at from one-half to one-third the cost of the ordinary high-grade varnishes formed from the expensive gums having a naturally higher melting-point than the ordinary rosin.

What I claim as my invention, and desire to secure by Letters Patent, is—

1. The herein-described process of forming a varnish-gum compound, consisting in combining an acid gum having a comparatively low melting-point with a metallic oxid thus forming a metallic soap, and then raising the temperature thereof until a chemical change in the metallic soap takes place, evidenced by an evolution of carbon dioxid and watery vapor, and a gum compound with a comparatively high melting-point is precipitated, substantially as set forth.

2. The herein-described process of forming a varnish-gum compound, consisting in first dissolving an acid gum in a solvent in the presence of a metallic oxid and so forming a neutral soap, and then raising the temperature thereof until a chemical change in the soap takes place, evidenced by an evolution of carbon dioxid and watery vapor, and a gum compound with a comparatively high melting-point is precipitated, substantially as set forth.

3. The herein-described process of forming a varnish-gum compound, consisting in combining rosin with oxid of zinc to form a so-called "zinc soap," and then raising the temperature thereof until a chemical change in the gum takes place, and a gum compound with a comparatively high melting-point is precipitated, substantially as set forth.

4. The herein-described process of forming a varnish, or a varnish-base, having a high melting-point, consisting in first combining an acid gum having a comparatively low melting-point with a metallic oxid thus forming a metallic soap, then raising the temperature until a chemical change in the soap takes place evidenced by an evolution of carbon dioxid and watery vapor, and a gum compound is precipitated, and then introducing a suitable solvent for the gum compound and dissolving the same therein, substantially as set forth.

In testimony whereof I, the said JAMES TODD, have hereunto set my hand.

JAMES TODD.

Witnesses:
JAMES I. KAY,
ROBERT C. TOTTEN.